United States Patent [19]

Michal et al.

[11] Patent Number: 5,488,683
[45] Date of Patent: Jan. 30, 1996

[54] METHOD FOR SPLICING POLARIZATION MAINTAINING FIBER WITH ELLIPTICAL STRESS MEMBER

[75] Inventors: Ronald J. Michal, Wrightwood; Fernando Torres, Canoga Park, both of Calif.

[73] Assignee: Litton Systems, Inc., Beverly Hills, Calif.

[21] Appl. No.: 235,172

[22] Filed: Apr. 29, 1994

[51] Int. Cl.[6] .................................................. G02B 6/255
[52] U.S. Cl. .................................. 385/98; 385/11; 385/96
[58] Field of Search ................................... 385/11, 95–99, 385/123

[56] References Cited

U.S. PATENT DOCUMENTS 4,950,318  8/1990  Dyott ........................................ 65/4.21
5,224,188  6/1993  Vali .......................................... 385/96
5,249,247  9/1993  Whitesmith .............................. 385/96

*Primary Examiner*—Frank Gonzalez
*Attorney, Agent, or Firm*—Lynn & Lynn

[57] ABSTRACT

The ends of a pair of polarization-maintaining optical fibers that each have an elliptical stress member in the cladding to produce stress induced birefringence are placed end-to-end with a predetermined gap between the ends of the fibers. The ends of the fibers are examined with an optical imaging apparatus whose focus is adjusted to locate an alignment band in each fiber. The position of one of the polarization-maintaining optical fibers is then adjusted until the two alignment bands are in longitudinal alignment. The fiber ends are pre annealed and then fused together by application of energy from an electric arc.

4 Claims, 5 Drawing Sheets

METHOD FOR SPLICING POLARIZATION MAINTAINING FIBER WITH ELLIPTICAL STRESS MEMBER

BACKGROUND OF THE INVENTION

This invention relates generally to splicing two optical fibers together end-to-end. In particular this invention relates to apparatus and methods for splicing one segment of polarization maintaining (PM) fiber with an elliptical stress member to another segment of the same type of fiber.

Fiber optic splices are used in making fiber optic rotation sensors and other fiber optic devices. A fiber optic rotation sensor uses the Sagnac effect in a coil of optical fiber to detect rotations about a sensing axis that is perpendicular to the plane of the coil. Counterpropagating light waves in the sensing coil experience a phase shift that is related to the rotation rate. The phase shift is seen as a change in the interference pattern the waves make when they are combined. The interference pattern is produced when two waves of the same polarization have traversed the fiber optic sensing coil in opposite directions and then interfere. The interference pattern may be monitored by directing it onto a photodetector, which produces an electrical signal indicative of the intensity of the light in the interference fringe pattern. Therefore, there are advantages to using polarization-maintaining fiber in forming a fiber optic rotation sensor.

A typical fiber optic rotation sensor includes components such as phase modulators and polarizers formed on an integrated optics substrate. An optical signal is input to a pair of optical waveguides formed on the integrated optics substrate. The integrated optics substrate ordinarily has fiber optic leads connected to the optical waveguides. The fiber optic sensing coil also has leads that are butt-coupled to the fiber optic leads that extend from the optical waveguides. Difficulty is sometimes encountered in achieving proper alignment of the two polarization-maintaining fibers being spliced together.

The polarization-maintaining fiber has polarization-dependent refractive indices. The speed of light in an optical fiber is $v=c/n$, where n is the refractive index. Because the refractive index depends upon the polarization, the polarization having the larger refractive index will have a smaller propagation speed in the fiber than the polarization having the smaller refractive index. An optical fiber that has different refractive index for the two possible polarizations is said to be birefringent. The two polarizations are therefore sometimes called the "fast" wave and the "slow" wave. The birefringence of an optical fiber may be characterized by two principal axes of birefringence. The polarization of a linearly polarized light wave input to the fiber with the direction of polarization parallel to one of the principal axes of birefringence will be preserved, or maintained, as the wave propagates along the length of the fiber. The light wave in the fiber will thus be either fast wave or the slow wave. An optical signal having polarization components along both principal axes of birefringence will have a first portion coupled into the fast wave in the fiber and a second portion coupled into the slow wave.

If the polarization of a signal is to be maintained at a splice, the principal axes of birefringence of the two optical fibers must be aligned in parallel. Otherwise, part of the fast wave in one fiber couples into the slow wave of the other fiber, which is a phenomenon called polarization cross coupling. If the polarization is to be maintained at the splice, polarization cross coupling is undesirable.

In some fiber optic rotation sensor applications depolarized light is input to the sensing coil. Depolarized light is produced when linearly polarized light is incident upon an end of polarization-maintaining fiber with the axis of polarization at a 45° angle to the principal axes of birefringence. In this arrangement, half of the incident light intensity couples into the fast wave and half into the slow wave.

Previously, the most common structure for polarization-maintaining fiber included a pair of rods in the cladding parallel to the core. The rods create a degree of birefringence in the such fibers such that the polarization of an input optical signal will be preserved as the optical signal propagates along the length of the fiber. Although this type of polarization-maintaining fiber structure provides generally satisfactory performance, the fiber has been found to be unduly expensive. Machines have been developed for splicing the earlier polarization-maintaining fibers together end-to-end. Such machines focus a light beam on the rods inside the fiber and align them before the fibers are spliced together with energy provided by an electric arc or other suitable energy source.

The newer fiber uses an elliptical stress member in the fiber core to produce the desired birefringence. This fiber has been found to have cost advantages over the previously used fiber. However, because of the internal structure of the new fiber, the standard passive techniques for aligning the birefringence axes are unusable. The new fiber does not include an internal structure that can be seen when the splicing machine focuses on the location where the rods could be seen in the older fiber.

One currently used splicing machine is the Fujikara model FSM-20 PM arc fusion splicer. This splicer normally aligns the birefringent axes of a pair of polarization maintaining fibers by utilizing a built-in imaging system. This system images the fibers from the side view and focuses on the stress inducing members that are used to create the birefringence feature of the fiber. When the machine images the new fiber from the side, no discernible features can be observed at the focal point of its built in imaging system.

Therefore, there is a need in the art for a technique for aligning these new fibers so that they may be spliced together end-to-end with the principal axes of birefringence of the two fibers being aligned.

SUMMARY OF THE INVENTION

This invention accordingly provides a technique for using a splicing machine for forming splices between the new optical fibers that use an elliptical stress member to create stress induced birefringence. The splicing technique of the present invention makes it possible to use the new 3M fiber in all applications of polarization-maintaining optical fiber where end-to-end splices must be formed.

The method according to the present invention for forming an end-to-end splice in a pair of polarization-maintaining optical fibers that each have a core and a cladding with an elliptical stress member being in the cladding to produce stress induced birefringence in the polarization-maintaining optical fibers comprises placing the ends of the pair of polarization-maintaining optical fibers end-to-end with a predetermined gap between the ends of the fibers. The ends of the fibers are examined with an optical imaging apparatus. The focus of the optical imaging apparatus is adjusted until an alignment band is seen in each polarization-maintaining optical fiber. The position of one of the polarization-maintaining optical fibers is adjusted until the two alignment bands are in longitudinal alignment.

The ends of the two polarization-maintaining optical fibers are pre annealed before splicing the ends together, and energy is applied to the ends of the fibers to fuse them together.

The method of the present invention may be practiced using a Fujikara model FSM-20 PM arc fusion splicer or other similar splicing apparatus. The splicer is set in a focus mode where the focus can be adjusted until the alignment bands are seen as out of focus images. The fibers are then rotated and translated as necessary to place the alignment bands in proper orientation for splicing.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
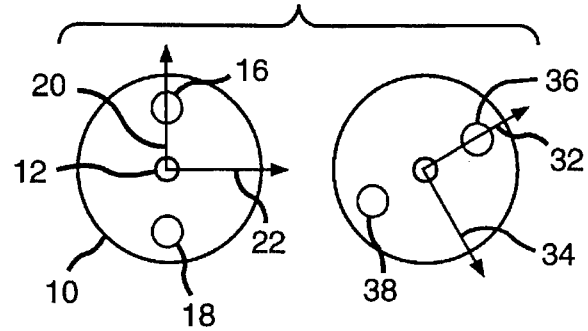
FIG. 1 shows end views of two polarization-maintaining fibers that have internal rods to produce birefringence with the rods in an arbitrary position before alignment.
Figure 2:
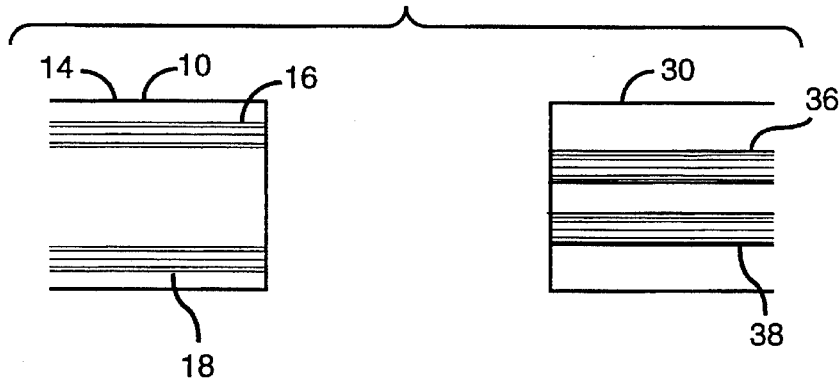
FIG. 2 is a side view of the two polarization-maintaining fibers of FIG. 1.

To facilitate an understanding of the advantages of the present invention, a brief description of previously used polarization-maintaining optical fiber and techniques for splicing them together is presented. Referring to FIGS. 1 and 2, a polarization-maintaining optical fiber 10 has a core 12 and a cladding 14. The core 10 is formed of a glass substance having a refractive index $n_1$. The core 10 has a generally circular cross section. The cladding 14 has a refractive index $n_2$. The refractive indices of the polarization-maintaining optical fiber 10 are selected such that light is guided in the core 12 by internal reflection at the interface between the core 12 and cladding 14. The polarization-maintaining optical fiber 10 includes a pair of longitudinal rod-like members 16 and 18 that cooperate with the cladding to produce birefringence in the core 12 such that the state of polarization of an optical signal input to the core 12 is preserved while the optical signal propagates in the polarization-maintaining optical fiber 10.

The polarization-maintaining optical fiber 10 has a pair of orthogonal principal axes of birefringence 20 and 22. An optical signal input to the polarization-maintaining optical fiber 10 will have polarization components along the two principal axes of birefringence 20 and 22. The magnitude of these polarization components remains constant as the optical signal propagates in the fiber.

FIG. 1 also shows a second polarization-maintaining optical fiber 30 that has a structure that is substantially identical to that of the polarization-maintaining optical fiber 10. Accordingly, the polarization-maintaining optical fiber 30 has principal axes of birefringence 32 and 34 and a pair of rod-like members 36 and 38. FIGS. 1 and 2 show the polarization-maintaining optical fibers 10 and 30 with their principal axes of birefringences in random orientation. It is possible to splice the two polarization-maintaining optical fibers 10 and 30 together with the principal axes of birefringence in the orientation of FIGS. 1 and 2. If this is done, then a linearly polarized optical signal having its direction of polarization parallel to the principal axis of birefringence 16 and guided by the polarization-maintaining optical fiber 10 toward the polarization-maintaining optical fiber 30, will have components along both of the principal axes of birefringence 32 and 34 in the polarization-maintaining optical fiber 30. The coupling of light having a first set of polarization components in a first fiber into a second set of polarization components in a second fiber is called polarization cross coupling.

In many applications it is desirable to have the corresponding principal axes of birefringence aligned parallel to one before the fibers are spliced together so that polarization cross coupling is avoided. Various types of equipment and techniques are used to align the fibers and splice them together.

Figure 5:
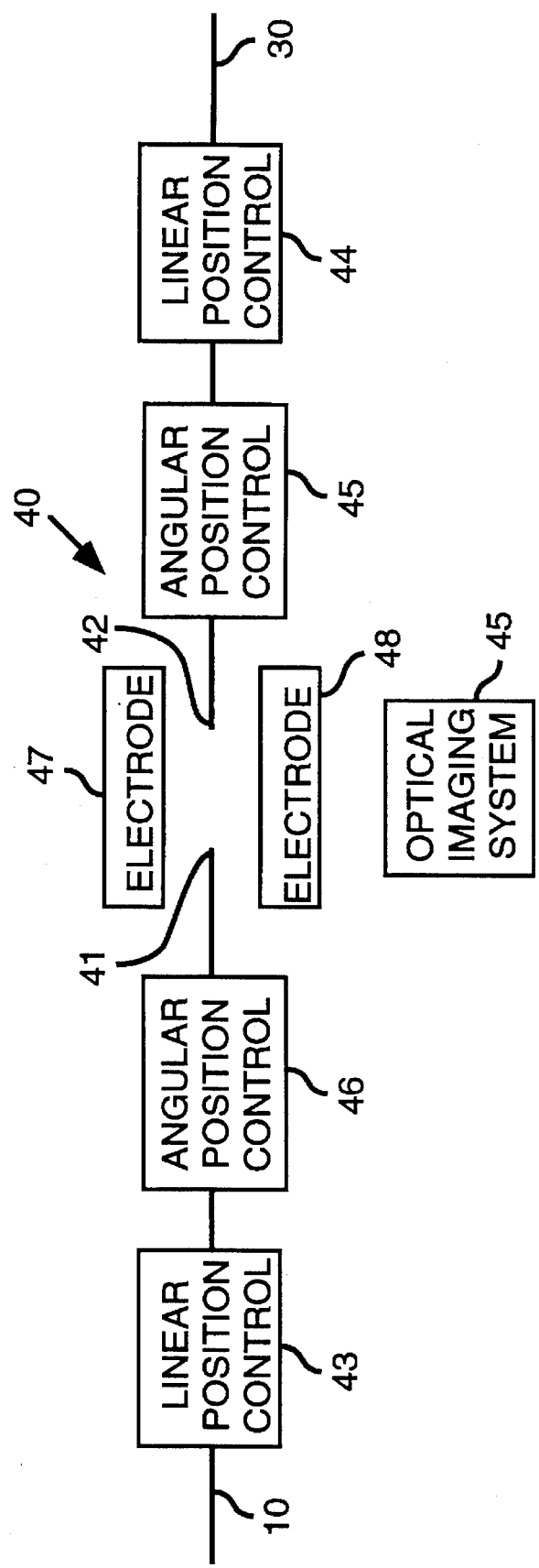
FIG. 5 schematically illustrates the basic operational characteristics of a fiber optic splicing machine that has been used to form end-to-end splices in fibers of the type shown in FIG. 1.

One such machine is the Fujikara model FSM-20PM arc fusion splicer, which is schematically illustrated in FIG. 5. FIG. 5 illustrates a splicer 40 which receives the ends 42 and 44 of the two fibers to be spliced. In its ordinary mode of operation, the splicer 40 includes a computer controlled imaging system 45 that focuses on the rods 16 and 18 in the fiber 10 and on the rods 36 and 38 in the fiber 30. When the fiber ends 41 and 42 are first received in the splicing machine 40, their principal axes of birefringence ordinarily will not be in any particular orientation. This is the situation illustrated in FIG. 2.

Figure 3:
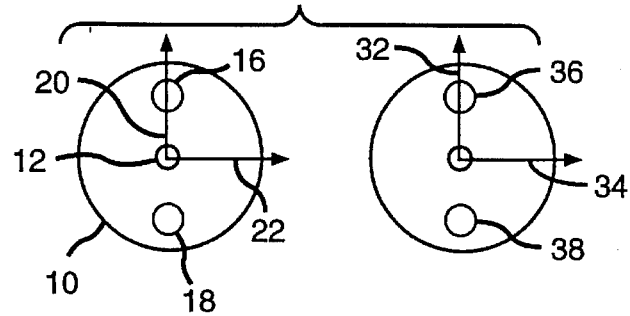
FIG. 3 shows end views of the two polarization-maintaining fibers of FIG. 1 after their principal axes of birefringence are placed in parallel alignment.
Figure 4:
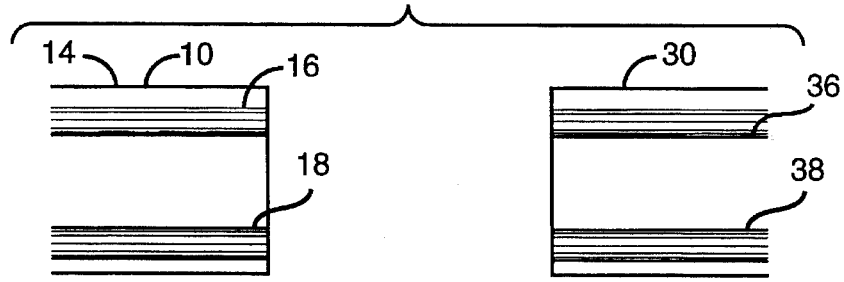
FIG. 4 is a side view showing the polarization-maintaining fibers of FIG. 3.

The machine 40 has linear position control apparatus 43 and 44, which sets the ends 41 and 42 to be a selected distance apart. The splicing machine 40 also has angular position control apparatus 45 and 46, which then adjusts the angular orientation the fibers 10 and 30 so that their corresponding principal axes are aligned parallel as shown in FIGS. 3 and 4. In its normal mode of operation, the machine focuses on the rods 16 and 18 in the fiber 10 and on the rods 36 and 38 in the fiber 30 to place them in alignment for splicing. Electrical energy is applied to a pair of electrodes 47 and 48 so that an electric arc is applied across the gap between the fiber ends 41 and 42. While the electric arc is being applied across the gap, the linear position control apparatus 43 and 44 moves the fiber ends 41 and 42 toward one another as the fusion splicing process proceeds.

FIGS. 6–9 illustrate a new type of polarization-maintaining optical fiber 50 which is now being used in fiber optic rotation sensors and other applications of optical fiber. The structure of the polarization-maintaining fiber 50 is presented here only for the purpose of facilitating an understanding of the present invention. The polarization-maintaining fiber 50 is commercially available from 3M Company and is not a part of the present invention. The polarization-maintaining fiber 50 has a core 52 and a cladding 54. A stress member 56 having a generally elliptical cross section is formed in the cladding 54. The elliptical stress member 56 applies stress to the core 52 to produce stress-induced birefringence. The core 52 therefore has effective refractive indices that are polarization-dependent.

Figure 6:
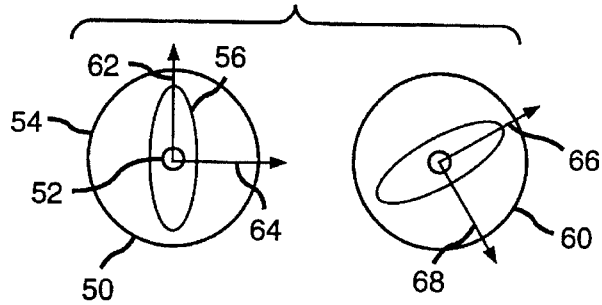
FIG. 6 shows end views of two polarization-maintaining fibers before their principal axes of birefringence are aligned.
Figure 7:
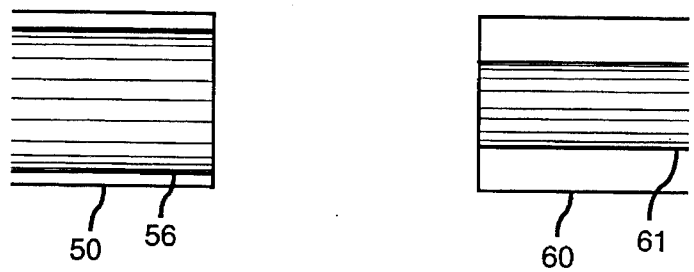
FIG. 7 is a side view of the two polarization-maintaining fibers of FIG. 6.
Figure 8:
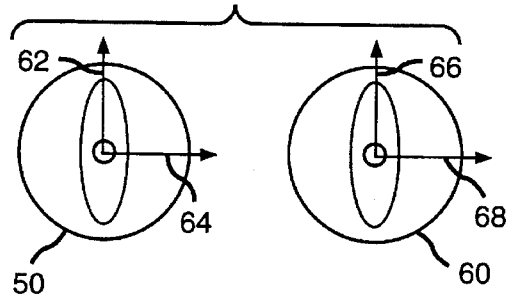
FIG. 8 shows end views of the two polarization-maintaining fibers of FIG. 7 after their principal axes of birefringence are placed in parallel alignment.
Figure 9:
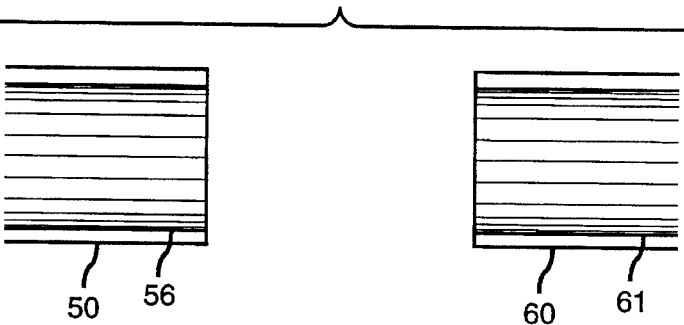
FIG. 9 is a side view showing the polarization-maintaining fibers of FIG. 7.

FIGS. 6 and 7 illustrate a pair of the new fibers 50 and 60 oriented in a manner that exemplifies the situation when the fiber 50 and 60 are first placed in the splicing machine 40. The polarization-maintaining fiber 60 includes an elliptical stress member 61 in its cladding. The polarization-maintaining fiber 50 has principal axes of birefringence 62 and 64, and the polarization-maintaining fiber 60 has principal axes of birefringence 66 and 68. Initially the corresponding principal axes are randomly oriented to each other. To avoid polarization cross coupling, the polarization-maintaining fibers 50 and 60 should be aligned as shown in FIGS. 8 and 9. Of course, if the polarization-maintaining fibers 50 and 60 are to be spliced to form a depolarizer, the corresponding principal axes of birefringence 62 and 66 should be oriented at a 45° angle to one another.

Unlike FIGS. 1 and 3, FIGS. 6 and 7 do not show what is imaged with the splicing machine 40. When the imaging system of the splicing machine 40 is focused in the vicinity of where the elliptical stress members are known to be located, no internal structure is seen in the polarization-maintaining optical fibers 50 and 60.

Figure 10:
FIG. 10 illustrates an out of focus image showing the structure of a polarization-maintaining fiber that includes an elliptical stress member to produce birefringence.

The splicing machine 40 has a focus mode that may be manually activated to focus past the normal imaging point on the fiber 50, for example. It has been found that the focus mode may be used to create observable structure. Analysis of the image shows that backscattered light outside the normal image plane highlights a unique position on the elliptical cladding layer 56. FIG. 10 illustrates out of focus images that are seen when the single polarization-maintaining optical fiber 50 is examined in the focus mode with the machine focused at a point beyond the location of the elliptical cladding layer 56. It has been found that the thin upper line 79 provides an alignment band, or reference line, that may be used to align the polarization-maintaining optical fiber 50 in a desired angular orientation.

Figure 11:
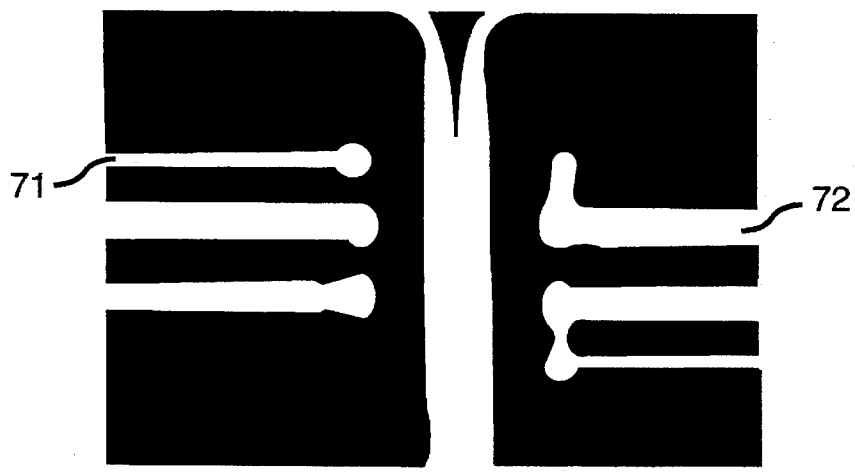
FIG. 11 illustrates two polarization-maintaining fibers placed end-to-end with one fiber being properly aligned and the other having a random orientation such that it is not in proper position for splicing.

FIG. 11 shows the out of focus images formed when the fibers 50 and 60 are placed end-to-end in the splicing machine 40 and imaged in the manner described in the preceding paragraph. The alignment band 71 in the polarization-maintaining optical fiber 50 and a similar alignment band 72 in the polarization-maintaining optical fiber 60 are laterally displaced from each other from the viewpoint of FIG. 11.

By putting the splicer 40 into its rotation mode to adjust the angular position of the polarization-maintaining optical fiber 50, the alignment band 71 can be made to appear or disappear as the fiber 50 rotates. To perform the alignment so that the fibers are aligned as shown in FIG. 9, one of the fibers 50 or 60 is rotated until the alignment bands 71 or 72 first appears. For simplicity it is assumed that the fiber 50 is rotated until the alignment band 71 is most clearly seen, which places it in the position shown in FIGS. 11 and 12. The fiber 60 is then rotated until the alignment band 72 appears.

The direction from which the alignment band 71 and 72 first appear to be visible must be noted since there is a slight redundancy in the appearance of the bands. Rotating the fibers 50 and 60 such that the alignment band 71 and 72 first appear from either the top or the bottom for both fibers 50 and 60 at the same time removes any redundancies.

Figure 12:
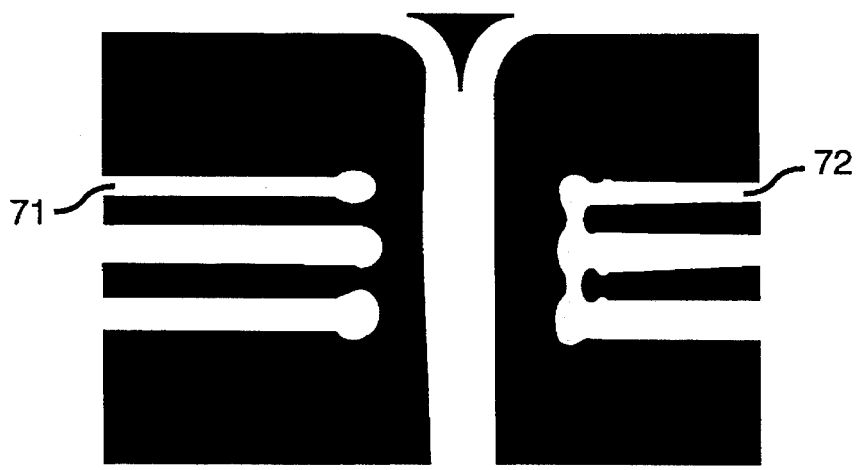
FIG. 12 illustrates images of two polarization-maintaining fibers placed end-to-end with both fibers being properly aligned for splicing end-to-end.

FIG. 11 shows the fiber with the alignment band 71 and 72 observable for the fiber 50 and the fiber 60 being at some random orientation. The ends of the fibers are moved until the two alignment band 71 and 72 are aligned end-to-end as shown in FIG. 12. It has been found that the alignment of the alignment band 71 and 72 as shown in FIG. 11 prior to fusion splicing represents alignment of the birefringent axes 62 and 64 of the polarization-maintaining fiber 60 with the corresponding birefringent axes 66 and 68 so that the fibers 50 and 60 may be spliced together.

The polarization cross coupling, which is the amount of optical signal coupled from one polarization into the other polarization at the splice between the fiber 50 and 60, provides a measurement of the degree of angular misalignment. The polarization cross coupling should be less than −24.5 dB for production fiber optic rotation sensor systems. This corresponds to an angular misalignment of the birefringent axes of about 3°.

About 15 sample splices with the 3M fiber were fabricated in the laboratory using the above described technique. These samples were measured with a white light station before and after the splice was made. Twelve of the 15 samples (80% yield) met the cross coupling requirement stated above.

Figure 13:
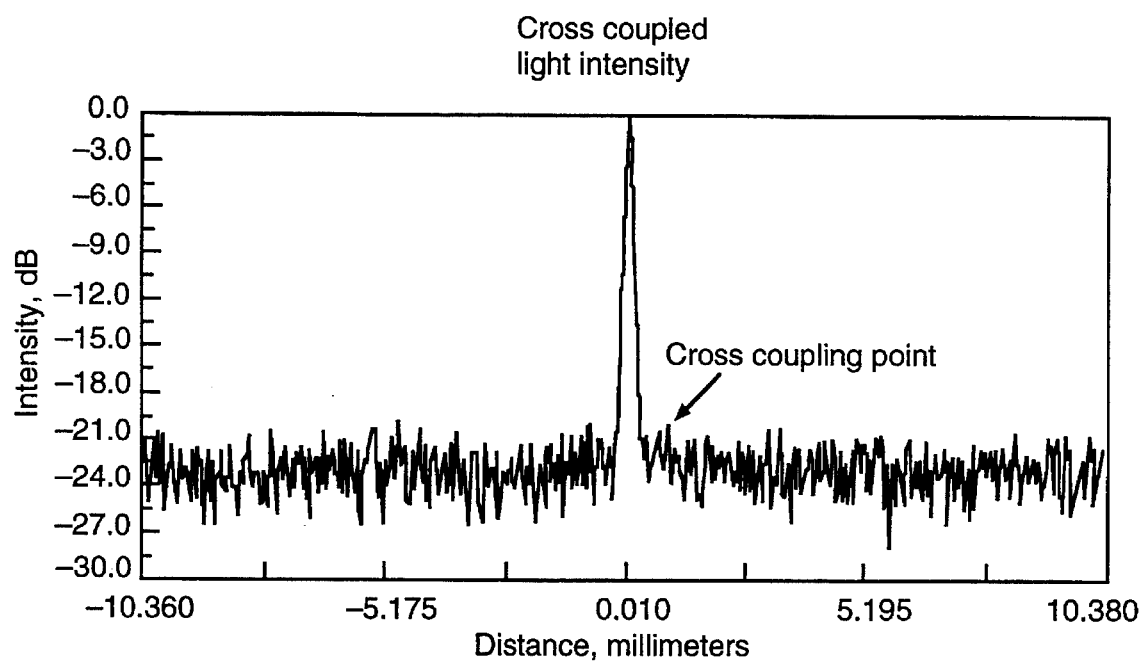
FIG. 13 graphically illustrates white light inteferometry data taken with two polarization-maintaining fibers placed end-to-end and aligned using the techniques of the present invention before splicing.
Figure 14:
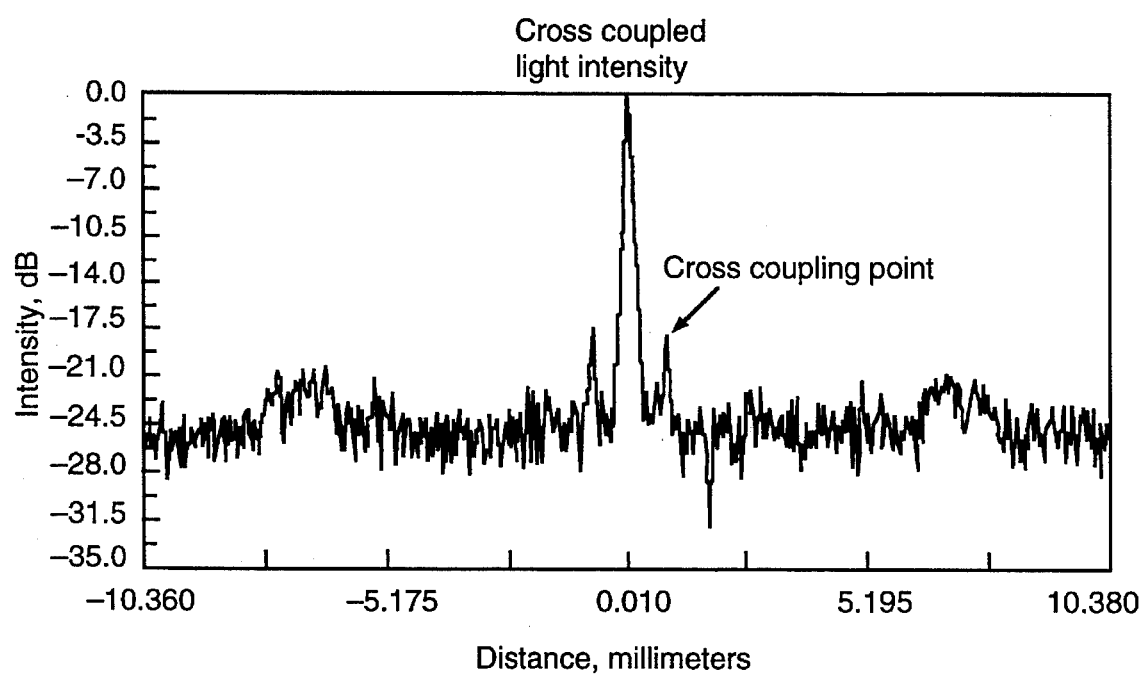
FIG. 14 graphically illustrates white light inteferometry data taken with two polarization-maintaining fibers spliced together end-to-end aligned using the techniques of the present invention after splicing.

A sample of the data for one of these splices is shown in FIGS. 13 and 14. Here the polarization cross coupling, which is twice the number indicated on the left side of the graphs, is measured to be −42 dB before the splice and −35 dB after the splice. These numbers correspond to angular misalignments of 0.5 and 1.0 degrees respectively. These are typical numbers that are consistently achieved with the fabrication technique of the present invention.

It is desirable to have a splicing technique for producing splices with high strength and low loss with yields acceptable for commercial production. After much experimentation it was determined that the secret to successfully splicing this fiber with a splicer such as the Fujikara splicer is to preanneal the fibers 50 and 60 before splicing. The prior art teaching is that the fiber should be prefused with low currents for short time durations. However, the prior art technique produced low yields when splicing the new 3M fiber with the splicer 40. Increasing the prefuse (or preanneal) time provides high yields of greater than 80% with this splicer.

The splicer settings that have been shown to be successful are listed below:

| Operating Mode: | Multimode Setting |
| --- | --- |
| Arc Duration: | 800 msec |
| Forward Time: | 36 msec |
| Prefuse Time: | 200 msec |
| Gap: | 8 microns |

Most of these settings will change by small amounts depending on conditions such as barometric pressure, humidity, and altitude.

The most important feature in the above table list deals with the annealing of the fibers prior to actually making the splice. The parameter which deals with the degree of annealing is the prefuse time. In the past this parameter was kept as small as possible. This forced splices to be made with relatively low arc times and power levels. This required the use of several arcs usually produced splices of low strength and high loss. By annealing the fibers first, only two arc cycles are required and yields for splices meeting factory requirements is about 80%.

Before development of the method of the present invention, the process of aligning and splicing polarization-maintaining optical fibers with an elliptical stress member was not possible without special equipment. Alignment of the birefringent axes of the fiber required an active alignment station and a significant amount of time to set up the fibers into such a station. Once the fibers were aligned, there was a relatively high chance that the actual splice would not be successful. The new processes described above produce aligned splices with 80% yields with no special stations required and only a few minutes to perform the splicing operation.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for forming an end-to-end splice in a pair of polarization-maintaining optical fibers that each have a core and a cladding with an elliptical stress member being in the cladding to produce stress induced birefringence in the polarization-maintaining optical fibers, comprising the steps of:

(a) placing the ends of the pair of polarization-maintaining optical fibers end-to-end with a predetermined gap between the ends of the fibers;

(b) examining the sides of the pair of optical fibers with an optical imaging apparatus;

(c) defocusing the optical imaging apparatus on the pair of optical fibers such that scattered light from the interfaces of the core and cladding becomes visible to form an alignment band in each of the pair of polarization-maintaining optical fibers; and (d) adjusting the angular position of one of the polarization maintaining optical fibers relative to the other one of the polarization-maintaining optical fibers until the alignment bands in the polarization-maintaining optical fibers are in longitudinal alignment.

2. The method of claim 1, further including the steps of:

(a) pre annealing the ends of the two polarization-maintaining optical fibers before splicing the ends together; and (b) applying energy to the ends of the fibers to fuse them together.

3. A method for forming an end-to-end splice in a pair of polarization-maintaining optical fibers that each have a core and a cladding with an elliptical stress member being in the cladding to produce stress induced birefringence in the polarization-maintaining optical fibers, comprising the steps of:

(a) placing the ends of the pair of polarization-maintaining optical fibers in a splicing machine end-to-end with a predetermined gap between the ends of the fibers;

(b) placing the splicing machine in a focus mode;

(c) adjusting the focus of the splicing machine to defocus on the pair of optical fibers until an alignment band becomes visible in the sides of each polarization-maintaining optical fiber; and (d) adjusting the angular position of one of the polarization maintaining optical fibers relative to the other one of the polarization-maintaining optical fibers until the alignment bands in the polarization-maintaining optical fibers are in longitudinal alignment.

4. The method of claim 3, further including the steps of:

(a) pre annealing the ends of the two polarization-maintaining optical fibers before splicing the ends together; and (b) applying energy to the ends of the fibers to fuse them together.

* * * * *